(12) United States Patent
Nayak

(10) Patent No.: US 11,930,244 B2
(45) Date of Patent: Mar. 12, 2024

(54) METHOD AND APPARATUS FOR PREVIEW DECODING FOR JOINT VIDEO PRODUCTION

(71) Applicant: SLING MEDIA PVT LTD, Bangaluru (IN)

(72) Inventor: Suhas Nayak, Bangalore (IN)

(73) Assignee: DISH Network Technologies India Private Limited (IN)

( * ) Notice: Subject to any disclaimer, the term of this patent is extended or adjusted under 35 U.S.C. 154(b) by 0 days.

(21) Appl. No.: 16/693,263

(22) Filed: Nov. 23, 2019

(65) Prior Publication Data

US 2021/0160563 A1    May 27, 2021

(51) Int. Cl.
| | |
|---|---|
| *H04N 21/438* | (2011.01) |
| *H04N 21/2187* | (2011.01) |
| *H04N 21/4223* | (2011.01) |
| *H04N 21/4363* | (2011.01) |
| *H04N 21/4402* | (2011.01) |

(52) U.S. Cl.
CPC ....... *H04N 21/438* (2013.01); *H04N 21/2187* (2013.01); *H04N 21/4223* (2013.01); *H04N 21/43637* (2013.01); *H04N 21/4402* (2013.01)

(58) Field of Classification Search
CPC ............. H04N 21/438; H04N 21/2187; H04N 21/4223; H04N 21/43637; H04N 21/4402
USPC .......................................................... 725/74
See application file for complete search history.

(56) References Cited

U.S. PATENT DOCUMENTS

| | | | | |
|---|---|---|---|---|
| 2005/0111819 | A1* | 5/2005 | Cormack | H04N 21/443 348/E5.006 |
| 2007/0121720 | A1* | 5/2007 | Yamane | H04N 19/14 375/240.08 |
| 2010/0040151 | A1* | 2/2010 | Garrett | H04N 21/440218 375/240.25 |
| 2013/0034146 | A1* | 2/2013 | Jeong | H04N 19/166 375/240.01 |
| 2013/0128947 | A1* | 5/2013 | Fryer | H04N 21/2343 375/240.01 |
| 2015/0089536 | A1* | 3/2015 | Byerley | H04N 21/4532 725/28 |
| 2015/0229989 | A1* | 8/2015 | Gavade | H04N 21/4126 725/31 |
| 2017/0104684 | A1* | 4/2017 | Seely | H04W 52/0258 |
| 2019/0223194 | A1* | 7/2019 | Arrobo Vidal | H04L 65/80 |
| 2019/0342522 | A1* | 11/2019 | Garrido | G06F 3/0488 |
| 2021/0321123 | A1* | 10/2021 | Strandby | H04N 19/42 |

* cited by examiner

*Primary Examiner* — Michael R Telan
(74) *Attorney, Agent, or Firm* — KW Law, LLP

(57) ABSTRACT

Systems and processes are provided for joint video production in an electronic device including receiving a first video stream from a first video capture device, determining an availability of a first decoder, coupling the first video stream to the first decoder in response to the first decoder being available, receiving a second video stream from a second video capture device, determining the availability of the first decoder, coupling the second video stream to a network interface for decoding by an external decoder in response to the first decoder decoding the first video stream, receiving a first decoded video stream from the first decoder, receiving a second decoded video stream from the network interface, and displaying the first decoded video stream and the second decoded video stream on a user interface.

20 Claims, 5 Drawing Sheets

METHOD AND APPARATUS FOR PREVIEW DECODING FOR JOINT VIDEO PRODUCTION

TECHNICAL FIELD

The following discussion generally relates to the provision of simultaneous preview video display in a video display device. More particularly, the following discussion relates to determining a usability of a secondary video decoder system for generating video previews in a video production application.

BACKGROUND

In recent years, streaming of video content over the internet has become more and more popular. Video streaming has begun to replace traditional broadcast television programming, such as cable television and over the air television broadcasts, with internet streamed media from internet media services providers and individual content creators. In addition, internet streaming is available to individuals wishing to broadcast video streams of family events, youth sporting events, weddings, etc. Traditionally, these events are captured with a video recording device and streamed via the internet using a social media services provider.

More and more electronic devices are being equipped with high quality cameras operative to capture video suitable for streaming on the internet. For example, mobile smartphones, computers, tablet computers, digital cameras, digital video cameras and the like may be operative to record video and to simultaneously transmit the video via a wireless communications network, such as a wireless local area network or cellular data network to social media services providers who in turn provide a live video broadcast to internet users.

While video streaming is able to deliver limited interest programming, such as a kindergarten graduation, to viewers on the internet, one disadvantage video streaming has over traditional broadcasting is that it is usually limited to one video point of view. It is difficult for a small production team, such as an individual, to handle multiple camera angles, content switching, live editing etc. It is therefore desirable to create systems and methods that are able to provide multiple camera angles of a live event and to allow an individual the opportunity to preview and switch between these camera angles easily. Other desirable features and characteristics will become apparent from the subsequent detailed description and the appended claims, taken in conjunction with the accompanying drawings and this background section.

BRIEF SUMMARY

Disclosed herein are human machine interface methods and systems and related circuitry for provisioning computational systems, methods for making and methods for operating such systems, and system equipped with onboard control systems. By way of example, and not limitation, presented are various embodiments of preview decoding for joint video production are disclosed herein.

In accordance with an aspect of the disclosure, a method for receiving a first video stream from a first video capture device, determining an availability of a first decoder, coupling the first video stream to the first decoder in response to the first decoder being available, receiving a second video stream from a second video capture device, determining the availability of the first decoder, coupling the second video stream to a network interface for decoding by an external decoder in response to the first decoder decoding the first video stream, receiving a first decoded video stream from the first decoder, receiving a second decoded video stream from the network interface, and displaying the first decoded video stream and the second decoded video stream on a user interface.

In accordance with another aspect of the present disclosure wherein the first decoded video stream and the second decoded video stream are transmitted via a wireless transmission channel to the user interface.

In accordance with another aspect of the present disclosure wherein the user interface is a tablet computer.

In accordance with another aspect of the present disclosure wherein the network interface is configured to communicate with an external video processing device having the external decoder.

In accordance with another aspect of the present disclosure including coupling the second video stream to the first decoder in response to the first decoder having ceased decoding of the first video stream.

In accordance with another aspect of the present disclosure wherein the first capture device is a video camera and the first video stream is received via a wireless local area network.

In accordance with another aspect of the present disclosure wherein the availability of the first decoder is determined in response to the first decoder performing a video decoding function.

In accordance with another aspect of the present disclosure including transmitting one of the first decoded video stream and the second decoded video stream via the network interface in response to a user selection received via the user interface.

In accordance with another aspect of the present disclosure, an apparatus including an input configured to receive a first video capture stream and a second video capture stream, a video decoder configured to decoding one of the first video stream and the second video stream to generate a first decoded video stream, a network interface configured to transmit one of the first video stream and the second video stream to a secondary video decoder and to receive a second decoded video stream from the secondary video decoder, a display configured to display the first decoded video stream and the second decoded video stream, and a processor configured to couple the first video stream from the input to the video decoder, to receive the first decoded video stream from the video decoder, to couple the second video stream to the network interface in response to the video decoder decoding the first video stream, to receive the second decoded video stream from the network interface, and to couple the first decoded video stream and the second decoded video stream to the display.

In accordance with another aspect of the present disclosure wherein the input is a wireless network interface and the first video stream is transmitted via a wireless communications network from a first video capture device and the second video stream is transmitted via the wireless communications network from a second video capture device.

In accordance with another aspect of the present disclosure wherein the first video stream is captured by a smartphone and is streamed wireless to the input.

In accordance with another aspect of the present disclosure wherein the second video stream is captured by a video camera and is streamed wireless to the input.

In accordance with another aspect of the present disclosure wherein the display is a user interface device and wherein the first decoded video stream and the second decoded video stream are transmitted wirelessly to the user interface device.

In accordance with another aspect of the present disclosure including a transmitter for transmitting the first decoded video stream in response to a user input received via the display.

In accordance with another aspect of the present disclosure including and encoder for encoding the first decoded video stream to generate an encoded video stream and a transmitter for transmitting the encoded video stream.

In accordance with another aspect of the present disclosure wherein the video decoder is operative to decode the second video stream in response to the video decoder not decoding the first video stream.

In accordance with another aspect of the present disclosure wherein the wherein the second decoded video stream has a lower resolution than the first decoded video stream.

In accordance with another aspect of the present disclosure wherein the processor is further configured to couple the second video stream from the input to the video decoder and to couple the first video stream to the network interface in response to a user generated control signal.

In accordance with another aspect of the present disclosure a video streaming device including a wireless access point configured to receive a first video stream from a first camera and a second video stream from a second camera, a decoder for decoding at least one of the first video stream and the second video stream to generate a first decoded video stream, a network interface configured to transmit at least one of the first video stream and the second video stream to a secondary video decoder and to receive a second decoded video stream, a processor configured to couple the first video stream to the decoder and for receiving the first decoded video stream, to couple the second video stream to the network interface in response to the decoder decoding the first video stream and for receiving the second decoded video stream, the processor being further operative for coupling the first decoded video stream and the second decoded video stream to the display device, and a display device configured to display a user interface including the first decoded video stream and the second decoded video stream.

In accordance with another aspect of the present disclosure wherein the processor is further configured to couple the second video stream to the decoder and to couple the first video stream to the network interface in response to a user generated control signal.

The above advantage and other advantages and features of the present disclosure will be apparent from the following detailed description of the preferred embodiments when taken in connection with the accompanying drawings.

BRIEF DESCRIPTION OF THE DRAWING FIGURES

The exemplary embodiments will hereinafter be described in conjunction with the following drawing figures, wherein like numerals denote like elements, and wherein.

The exemplifications set out herein illustrate preferred embodiments of the disclosure, and such exemplifications are not to be construed as limiting the scope of the disclosure in any manner.

DETAILED DESCRIPTION

The following detailed description is intended to provide various examples, but it is not intended to limit the disclosure or the application and uses of the disclosure. Furthermore, there is no intention to be bound by any theory presented in the preceding background or the following detailed description.

The general concepts described herein may be implemented in any multicamera broadcasting device. For convenience of illustration, the following discussion often refers to a wireless video transmission device operative to receive video from a video producing device, such as a digital camera via a video cable, via a wireless data connection or a wired connection, such as via an HDMI cable, and to convert a format of the video and to transmit the video via a wireless network. The actions taken in response to the preview decoding for joint video production can be associated with the functionality of the mobile phones, portable electronic entertainment devices, and any other video recording or editing device. Additional details and examples are provided in the following description.

Figure 1:
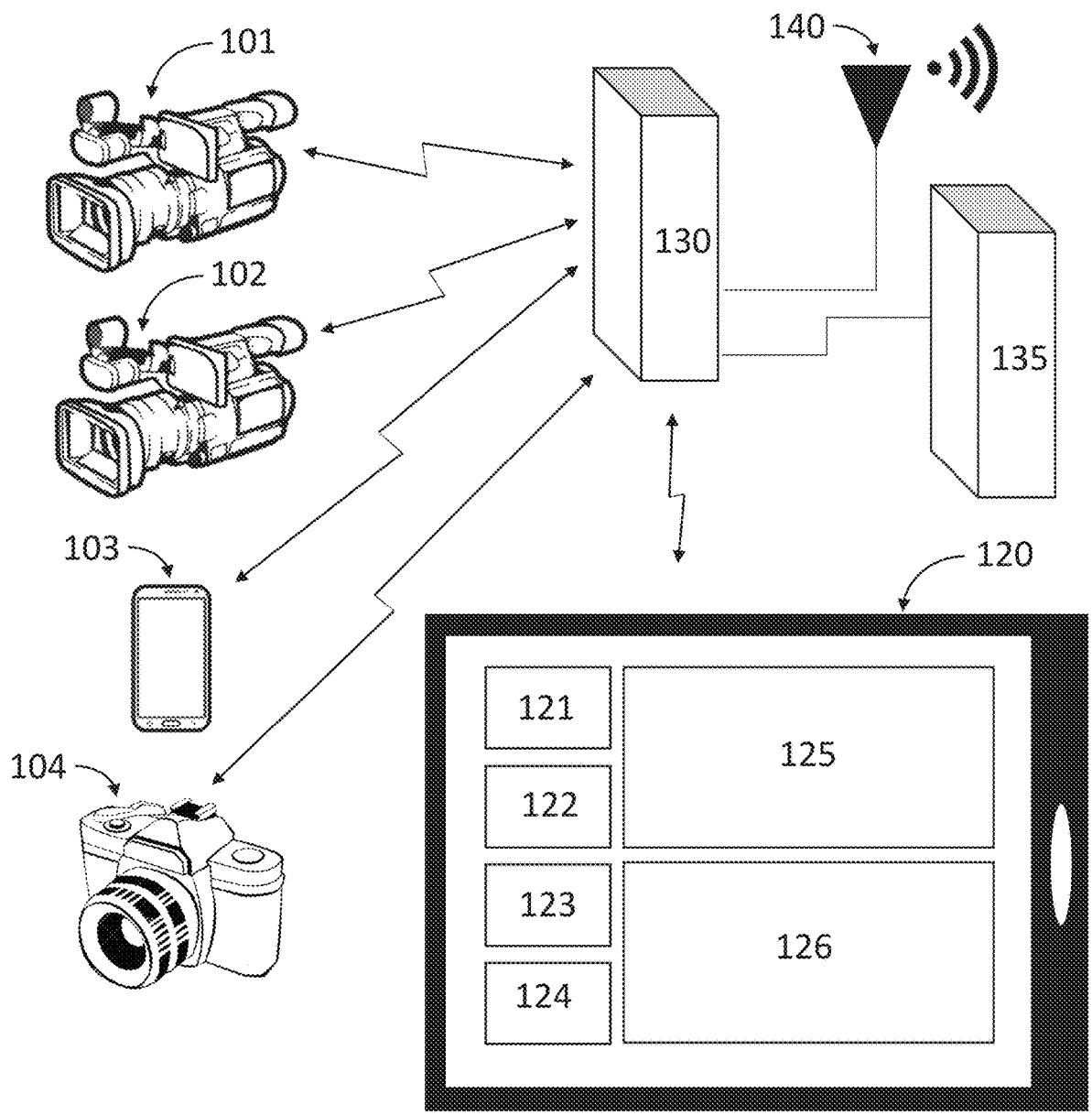
FIG. 1 shows an application 100 for preview decoding for joint video production according to an exemplary embodiment of the present disclosure.

Turning now to FIG. 1, an environment for a system 100 for joint video production in an electronic device according to an exemplary embodiment of the present disclosure is shown. The exemplary system 100 may include a first camera 101, a second camera 102, a third camera 103 and a fourth camera 104. The system 100 may further include a video hub 130, an antenna 140, and a user interface device 120 operative to display a first source video 121, a second source video 122, a third source video 123, a fourth source video 124, a preview window 125 and a program window 126.

In this exemplary embodiment, the video hub 130 is operative to receive video data from one or more of the first camera 101, a second camera 102, a third camera 103 and fourth camera 104. The cameras 101, 102, 103, 104 may be a mobile smartphone, a digital camera with video capture features, a video camera, a webcam or any device operative to capture video and to transmit the video in real time. The cameras 101, 102, 103, 104 may be operative to transmit the received video via a wireless local area network transmission, or may couple the video to the video hub 130 via a cable, such as an HDMI cable, or employ an intermediate device, such as a separate modem or cam link device to couple the video to the video hub 130.

The video hub 130 is operative to receive video from one or more cameras 101, 102, 103, 104, to convert this video to a format suitable for video streaming via the internet, and to transmit this video data in the video streaming format. The video data may be transmitted wirelessly via the antenna 140 to a wireless network such as a cellular network or a wireless local area network, or be connected via an electrical cable, such as an ethernet cable to a local area network and/or network router which may in turn be connected to the internet. The video hub 130 may include one or more video decoders for decoding the video received from one or more cameras 101, 102, 103, 104 and at least one encoder for encoding the outgoing video to a format suitable for transmission via the internet or local area network.

The video hub 130 may further be operative to generate a data signal for coupling to the user interface device 120 such that a user may generate control signals for controlling the video hub 130. For example, the video hub 130 may be operative to stream four video signals, each generated in response to video data received from each of the cameras 101, 102, 103, 104 to the user interface device 120 such that the user interface device 120 may then display the first source video 121, the second source video 122, the third source video 123 and the fourth source video 124. In an exemplary embodiment, the user may then be enabled to select one of the video sources for display in the preview window 125, which may be larger than each of the source videos or may have additional formatting generated in response to user commands. In addition, the user interface device 120 may display the program window 126 which is indicative of a video currently being transmitted, or streamed, by the video hub 130.

In an exemplary embodiment, the number of source videos 121, 122, 123, 124 that may be displayed by the user interface device 120 may be limited by the number of video decoders within the video hub 130. For example, if the video hub 130 is equipped with only two video decoders, the video hub 130 may be only operative to provide decode two video signals from the connected cameras 101, 102, 103, 104 and generate two preview videos to couple to the user interface device 120. In this example, the user may be operative to switch between a non-decoded video and a decoded video, but would not be able to preview the non-decoded video. In addition, there would be a time delay between selecting a new input to preview and the generation of decoded video presented in one of the source videos 121, 122, 123, 124.

To address the limited number of decoders to decode the source videos 121, 122, 123, 124, the system 100 may further employ a secondary video hub 135 having additional video decoders. The video hub 130 may then receive video data from the cameras 101, 102, 103, 104, decode a first subset of the video data for display in one or more source videos 121, 122, 123, 124 and couple a second subset of the source videos source videos 121, 122, 123, 124, to the secondary hub 135 for decoding by one or more decoders within the secondary hub 135. The secondary hub 135 is then operative to couple the decoded videos back to the video hub 130 for display in one or more source videos 121, 122, 123, 124. In one exemplary embodiment, the videos decoded by the secondary hub 135 may be combined into a single video displaying each of the decoded videos as a portion of the picture, such as split screen viewing or quadrant viewing for four video streams. In addition, it may be desirable to have the video data currently being displayed in the preview window 125 and/or the program windows to be decoded by the video hub 130 to reduce the time lag of the displayed source videos 121, 122, 123, 124 due to transmission between the video hub 130, the secondary video hub 135 and back.

In an exemplary embodiment, the video hub 130 and the secondary video hub are connected in tandem. The video hub 130 may be operative to host Dynamic Host Configuration Protocol (DHCP) server and the secondary video hub 135 may connect to video hub 130 as DCHP client. Connection could be over Ethernet or wireless local area network (WLAN) transmission. The video hub 130 may be operative for pulling the video data from the cameras 101, 102, 103, 104 and any additional video sources, such as the internet, and would handle the decoding of the received video data until the maximum number of video decoders has been met. That this point, the video hub 130 would forward the additional video data to the secondary video hub 135 for decoding. The secondary video hub 135 would then generate individual preview streams from the additional video data and would couple the individual preview streams to the video hub 130. In one exemplary application, the secondary video hub 135 may generate a quad video preview stream where one video stream includes images from four video data. The video hub 130 is then operative to couple the received preview streams to the user interface device 120 for display to a user. In one exemplary embodiment, the user interface device 120 may be connected to the video hub 130 via an access point (AP) without connecting to or being aware of the secondary video hub 135. The user interface device 120 may be operative to perform a quad split operation on the quad video preview streams from the video hub 130 to display the source videos 121, 122, 123, 124 individually. The user interface device 120 may be further operative to generate additional source video display locations on the user interface for preview of the additional preview streams.

In an exemplary application, the user interface device 120 may be operative to trigger a live composition change request to the video hub 130 to change the video data being decoded and previewed. The video hub 130 would then be responsible for generating the preview video streams requested by the user interface device 120. The video hub 130 may generate the preview video streams seamlessly if the requested video data are being decoded by the video hub 130 decoders. Otherwise, video hub 130 would trigger a swap request to secondary video hub 135 with the list of interested inputs that video hub 130 would like handle and list inputs that secondary video hub 135 should handle. Once the swap is complete, video hub 130 may then generate the required live composition. The swap may result in an increase in live composition change latency and make live transition such as swipe and dissolve impossible to achieve. The video hub 130 may then be responsible for publishing the live stream to user interface device 120. The master directory of the secondary video hub 135 may be listed as an additional external storage from the video hub 130.

In an additional exemplary embodiment, the AP hosted by the video hub 130 may require enough bandwidth margin to support as many as eight video data captures from the cameras 101, 102, 103, 104 and additional cameras and video data sources (not shown) as well as two preview streams and one program stream. The user interface device 120 displayed graphical user interface would be modifiable to handle the additional preview streams.

Figure 2:
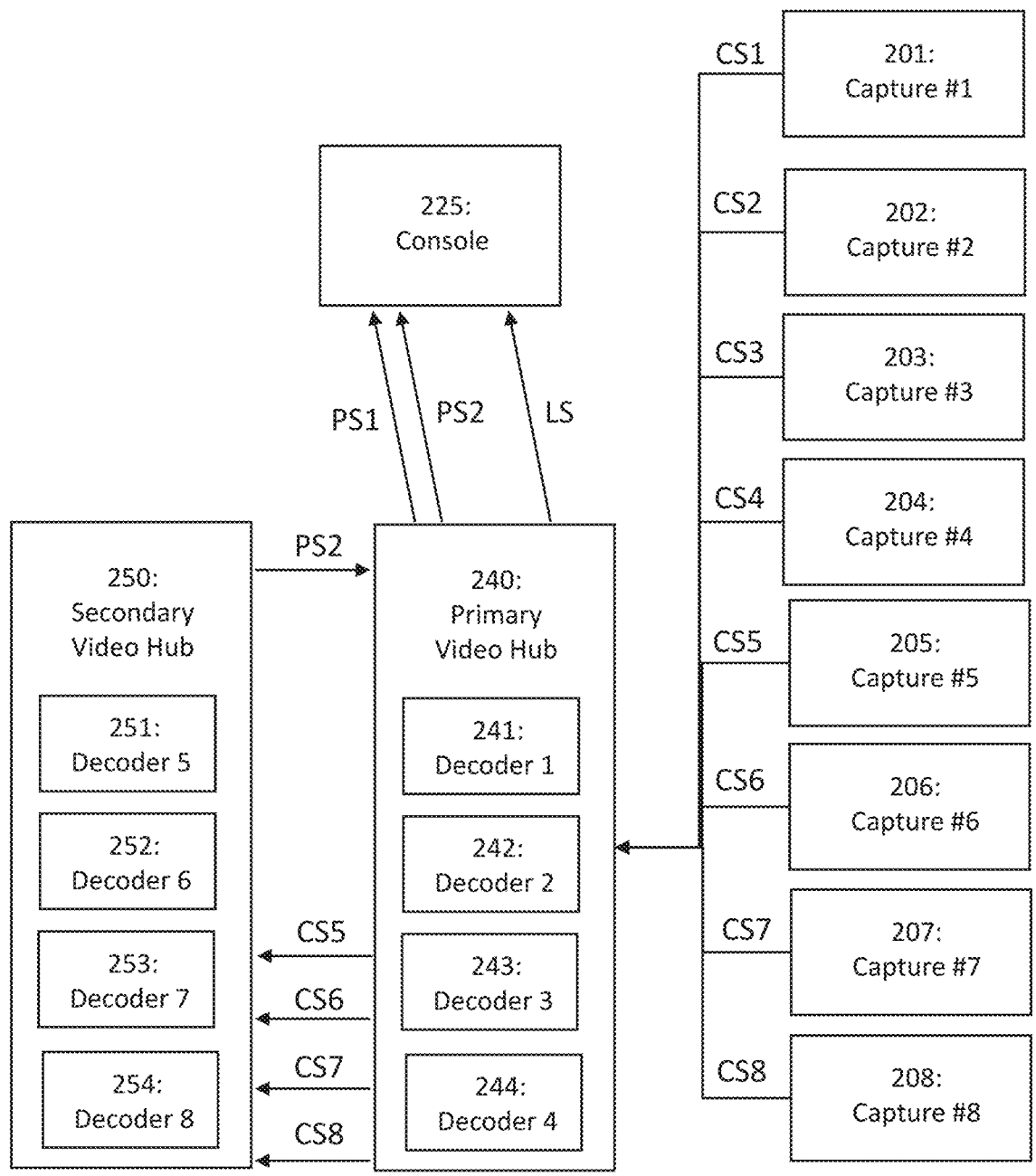
FIG. 2 shows a system 200 for preview decoding for joint video production according to an exemplary embodiment of the present disclosure.

Turning now to FIG. 2, a system 200 for joint video production in an electronic device according to an exemplary embodiment of the present disclosure is shown. The exemplary system 200 is illustrative of a cascaded video hub stream flow having a primary video hub 240 and a secondary video hub 250. In this example, each of the primary video hub 240 and a secondary video hub 250 have four video decoders 241-244 and 251-254 operative to decode eight captured video streams CS1-CS8 from eight video captured devices 201-208. While this embodiment is described in terms of eight video capture streams CS1-CS8 and one secondary video hub 250, any number of video capture streams and number of secondary video hubs may be employed wherein the number of secondary video hubs are determined by the number of video encoders within each secondary video hub and the number of video capture streams to be decoded and previewed.

The exemplary system 200 includes a primary video hub 240 having a decoder 1 241, a decoder 2 242, a decoder 3 243 and a decoder 4 244. The decoders 241-244 are operative to decode video data received within up to four of the capture stream CS1-CS8 received from capture devices 201-208. Furthermore, if additional capture streams are requested to be decoded in response to a user command received at a user console 225, the primary video hub 240 may be further operative to pass a number of encoded capture streams CS5-CS9 to the secondary video hub 250.

In an exemplary application, capture device 1 201 is a video recording device having a wireless data connection to the primary video hub 240. Capture device 1 201 is operative to capture a video data, convert the video data to a format suitable for transmission over the wireless data connection and to stream the video data via capture stream 1 CS1. The primary video hub 240 is operative to receive capture stream 1 CS1 and to couple captures stream 1 CS1 to decoder 1 241. Decoder 1 241 is operative to decode the video data carried by capture stream 1 CS1 and to couple the decoded video data stream to a processor within the primary video hub 240. A similar process is performed for capture stream 2 CS2 with decoder 2 242, capture stream 3 CS3 with decoder 3 243 and capture stream 4 CS4 with decoder 4 244. In this exemplary embodiment, the processor within the primary video hub 240 may be operative to generate a primary quad view preview stream PS1 for coupling to the user console 225. The primary preview stream PS1 may have each of the four decoded video streams in one of four quadrants of a video stream presented by the primary quad view preview stream PS1.

Furthermore, in this exemplary embodiment, capture device 5 205 is a video recording device, such as a mobile smartphone, having a wireless data connection to the primary video hub 240. Capture device 5 206 is operative to capture a video data, convert the video data to a format suitable for transmission over the wireless data connection and to stream the video data via capture stream 5 CS5. The primary video hub 240 is operative to receive capture stream 1 CS1 and to couple captures stream 1 CS1 to decoder 1 241. In this exemplary embodiment, each of decoder 1 241, decoder 2 242, decoder 3 243 and decoder 4 244 are already occupied decoding capture stream 1 CS1, capture stream 2 CS2, capture stream 3 CS3 and capture stream 4 CS4. In light of all of the onboard video decoders within the primary video hub 240 being previously occupied, the primary video hub 240 is then operative to couple the capture stream 5 CS5 for processing to the secondary video hub 250. The secondary video hub 250 is then operative to couple the capture stream 5 CS5 to decoder 5 251 for decoding. A similar operation may be performed with capture stream 6 CS6, captures stream 7 CS7 and capture stream 8 CS8 to decoder 6 252, decoder 7 253 and decoder 8 254 respectively.

The secondary video hub 250, or a processor therein, is next operative to receive four decoded video streams, one from each of decoder 5 251, decoder 6 252, decoder 7 253 and decoder 8 254. In this exemplary embodiment, the secondary video hub 250 may then be operative to combine the four decoded video streams into a secondary quad view preview stream PS2 and to couple this secondary preview stream PS2 to the primary video hub 240. The primary video hub 240 is then operative to couple the secondary preview stream PS2 to the user console 225. In one exemplary embodiment, the user console 225 may then be operative to split the primary preview stream PS1 into four video streams for presentation to a user in four different preview windows. Likewise, the user console 225 may be further operative to split the secondary preview stream PS2 into four video streams for presentation to a user in four different preview windows. Alternatively, the user console 225 may present the primary preview stream PS1 and/or the secondary preview stream PS2 as quad view video streams to a user.

In a further exemplary embodiment, the user console 225 may further be operative to display one of the video streams from the primary preview stream PS1 in a video production preview window wherein the video production preview window may be larger than the preview window or the quad view video stream presentation. The user console 225 may further generate a production preview request control signal in response to the user selecting one of the video streams from the secondary preview stream PS2 for display in the video production preview window. As the video production preview window may operative to display a video that is ready to be streamed or is being streamed via the internet to remote viewers, it is desirable to have a primary video hub 240 decoder perform the video decoding to avoid processing delays emanating from the coupling of the signals between the primary video hub 240 and the secondary video hub 250. For example, if decoder 1 241 is currently operative to decoder capture stream 1 CS1 and decoder 5 251 is currently operative to decode capture stream 5 CS5, and the primary video hub 240 received a request from the user console 225 indicative of a request to display the video data of capture stream 4 CS5 in the video production preview window, primary video hub 240, or a processor therein, may then couple capture stream 1 CS1 to the secondary video hub 250 for decoding by decoder 5 251 and couple captures stream 5 CS5 to decoder 1 241. Decoder 1 241 is then operative to decode capture stream 5 CS5, return the decoded video data from captures stream 5 CS5 to the primary video hub 240 for combination into preview stream 1 PS1. In addition, the primary video hub 240 may generate a live stream LS to couple to the user console 225 for display to a user. The live stream LS may be indicative of what is currently being lived streamed from the primary video hub 240 to viewers over the internet.

Figure 3:
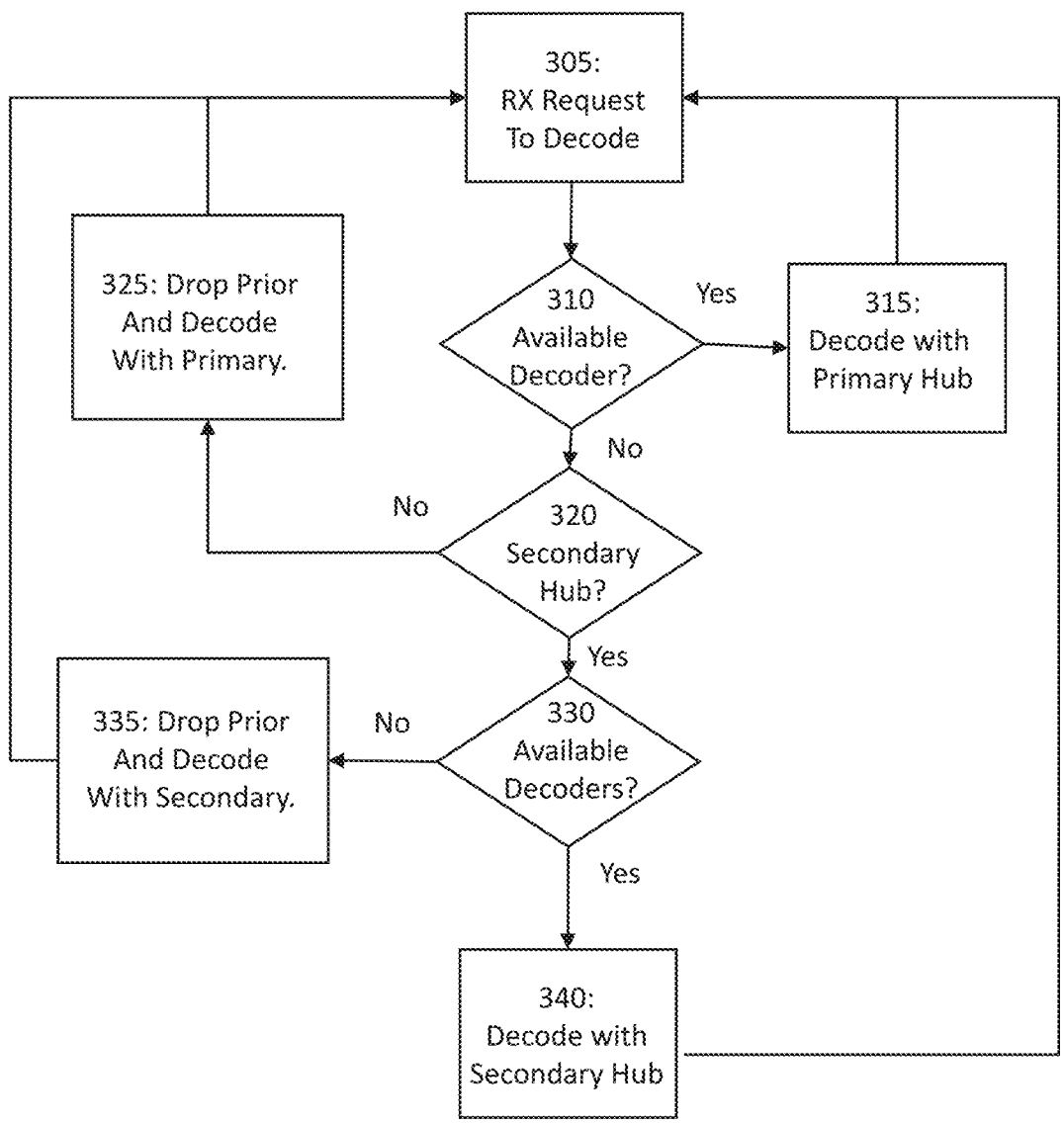
FIG. 3 shows a method 300 for preview decoding for joint video production according to an exemplary embodiment of the present disclosure.

Turning now to FIG. 3, a method 300 for joint video production in an electronic device is shown. The method is first operative to receive 305 a request to decode a captured stream from a video production device, such as a digital camera, mobile phone, or video camera. The request may be received at a primary video hub from a user console, such as a tablet computer or mobile phone and is indicative of a user selecting a capture stream to be previewed on the user console. The captured stream may be received via wireless transmission from a mobile phone device, a video camera, digital camera, or the like.

The method is next operative to determine 310 if there are decoders available within the primary video hub device. A decoder is available if it is not decoding another captured stream. In an exemplary embodiment, the primary video hub may be equipped with four video decoders. If each of these four video decoders have previously been assigned a capture stream to decode and are actively decoding the captured stream, the decoder is not available. If a decoder is available, the method is then operative to decode 315 the requested capture stream with the decoder and to couple the decoded video to the user console via a preview stream or the like. The capture stream may be encoded in MPEG2, MPEG4, H.264 or ATSC and may output a digital video data stream to be coupled to a user interface on a user console or the like. The method is then operative to return to waiting for a request to decode 305 a subsequent capture stream.

If no decoder is available within the primary video hub, the method is next operative to determine 320 if a secondary video hub is available. A secondary video hub may be connected in tandem to the primary video hub via an ethernet cable or wireless local area network. The secondary video hub availability may be determined by establishing a communications protocol between the primary video hub and the secondary video hub. If no secondary hub is available to the primary hub, the method may be then operative stop decoding 325 a prior selected capture stream, such as the capture stream that has been being decoded without being selected for viewing in a production preview screen or the like within a user interface on the user console. The method is then operative to return to waiting for a request to decode 305 a subsequent capture stream. The method may then use the decoder that had been previously decoding the prior selected capture stream to decode the currently selected capture stream. Other algorithms for stopping decoding of a prior capture stream may be used and are dependent on design and hardware criteria independent of the currently disclosed system and method.

If a secondary hub is determined to be connected to the primary hub, the method is next operative to determine 330 if the secondary hub has a decoder available. If the secondary hub has a decoder available, the method is next operative to decode 240 the requested capture stream with the available decoder within the secondary hub. The method is then operative to return to waiting for a request to decode 305 a subsequent capture stream. If no decoder is available within the secondary hub, the method is then operative to stop decoding 335 a prior selected capture stream currently being decoded by a decoder within the secondary hub and then use the decoder that had been previously decoding the prior selected capture stream to decode the currently selected capture stream. The method is then operative to return to waiting for a request to decode 305 a subsequent capture stream.

Figure 4:
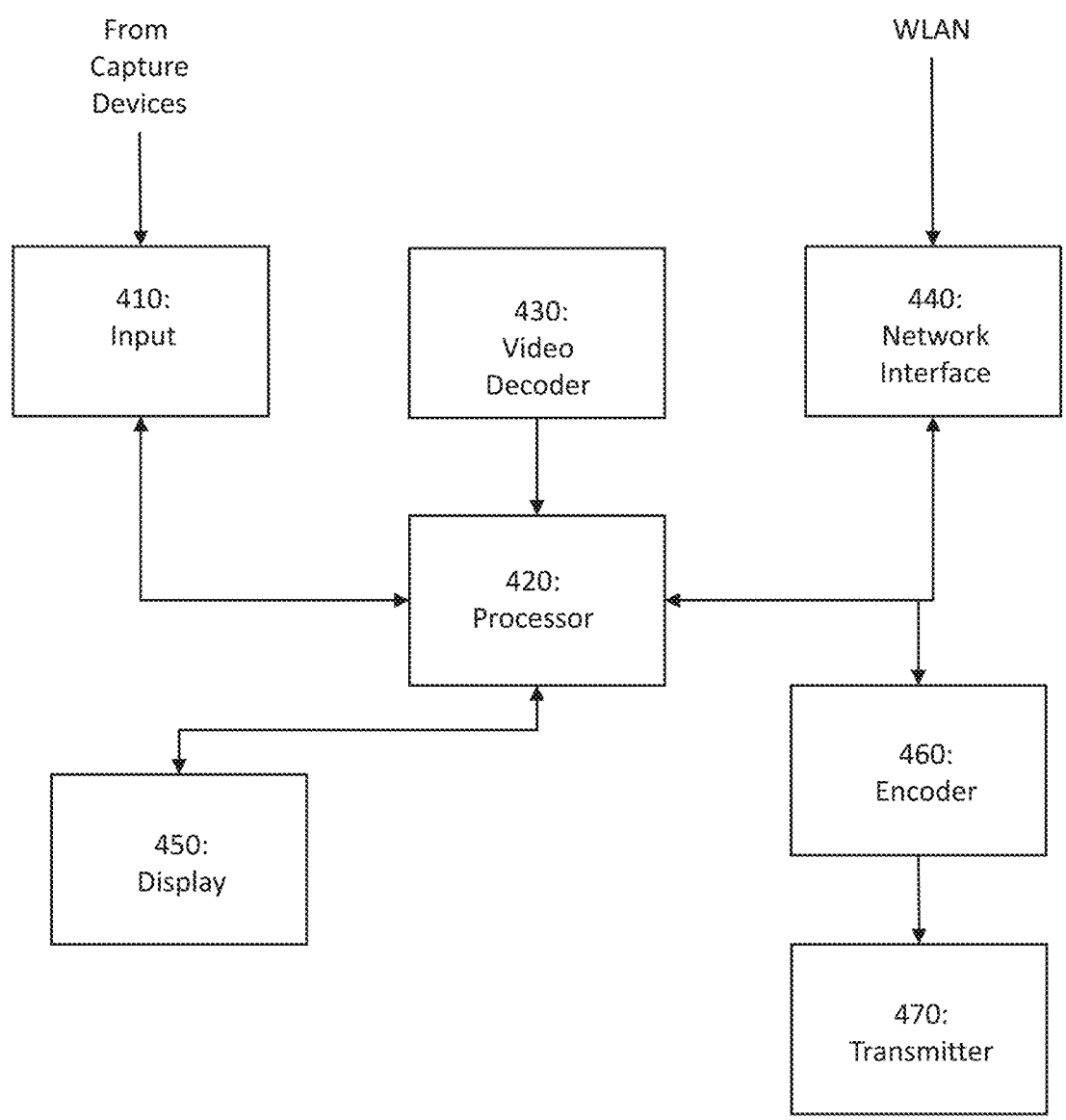
FIG. 4 shows another system 400 for preview decoding for joint video production according to another exemplary embodiment of the present disclosure.

Turning now to FIG. 4, another system 400 for joint video production in an electronic device according to an exemplary embodiment of the present disclosure is shown. In this exemplary embodiment, the system 400 is operative to receive a plurality of video capture streams, to decode the video captures streams, to generate preview video streams to couple to a user interface and to encode one of the decoded video capture streams for streaming via the internet. The system 400 may include an input 410, a processor 420, a video decoder 430, a network interface 440, a display 450, an encoder 460 and a transmitter.

In an exemplary embodiment, an input 410 is configured to receive a first video capture stream and a second video capture stream. The input 410 may be a wireless network interface, or a wireless access point. The first video stream may be transmitted via a wireless communications network from a first video capture device and the second video stream may be transmitted via the wireless communications network from a second video capture device. The first video stream may be captured by a smartphone, mobile phone, personal computer or the like having video recording and transmitting capabilities for streaming the first video stream via a wireless network to the input 410. Likewise, the second video stream may be captured by a video camera, digital camera with video recording capabilities, or the like wherein the second video stream is streamed wireless to the input 410. In another exemplary embodiment, the input 410 is a wireless access point configured to receive a first video stream from a first camera and a second video stream from a second camera.

The video decoder 430 may be configured for decoding one of the first video stream and the second video stream to generate a first decoded video stream. The video decoder 430 may be further operative to decode the second video stream in response to the video decoder 430 not decoding the first video stream. In an exemplary embodiment, the video decoder 430 is configured for decoding at least one of the first video stream and the second video stream to generate a first decoded video stream;

In this exemplary embodiment, the network interface 440 may be configured to transmit one of the first video stream and the second video stream to a secondary video decoder and to receive a second decoded video stream from the secondary video decoder. The secondary decoder may be located within a secondary video processing hub that is connected in tandem with the system. The network interface 440 may be further configured to transmit at least one of the first video stream and the second video stream to the secondary video decoder and to receive a second decoded video stream.

The display 450 may be configured to display the first decoded video stream and the second decoded video stream. The display 450 may be a user interface device operative to display a graphical user interface including a first video preview of the first decoded video stream and a second video preview of the second decoded video stream. The first decoded video stream and the second decoded video stream may be transmitted wirelessly to the user interface device via Bluetooth, near field communications, or a wireless local area network. In an exemplary embodiment, the first video stream may be displayed as a primary production preview video and the second decoded video stream may be show as a camera capture device preview video. In this example, the second decoded video stream may have a lower resolution than the first decoded video stream.

In this exemplary embodiment, the processor 420 may be configured to couple the first video stream from the input 410 to the video decoder 430, to receive the first decoded video stream from the video decoder 430, and to couple the second video stream to the network interface 440 in response to the video decoder 430 decoding the first video stream. The second video stream is coupled to the external video decoder via the network interface 440 if the video decoder internal to the system 400 is occupied. The processor 420 is further operative to receive the second decoded video stream from the network interface 440 and to couple the first decoded video stream and the second decoded video stream to the display 450 for presentation to a user. The processor 420 may be further configured to couple the second video stream from the input 410 to the video decoder 430 and to couple the first video stream to the network interface 440 in response to a user generated control signal. For example, the user may select the second video stream as the primary production preview and the first video stream as a camera capture device preview video. In this embodiment, it may be more desirable to have the second video stream encoded by the video decoder 430 within the system 400.

The processor 420 may be further configured to couple the first video stream to the video decoder 430 and for receiving the first decoded video stream from the video decoder 430 and for coupling the second video stream to the network interface 440 in response to the video decoder 430 decoding the first video stream. The processor being further operative for coupling the first decoded video stream and the second decoded video stream to the display 450 for presentation to a user as part of a graphical user interface. The processor 420 may be further configured to couple the second video stream to the video decoder 430 and to couple the first video stream to the network interface 440 in response to a user generated control signal.

The system 400 may further include a transmitter 470 for transmitting the first decoded video stream in response to a user input received via the display. The first decoded video stream may be transmitted via the internet to one or more remote viewers. In addition, the system 400 may include an encoder 460 for encoding the first decoded video stream to generate an encoded video stream wherein the transmitter 470 is then operative for transmitting the encoded video stream.

Figure 5:
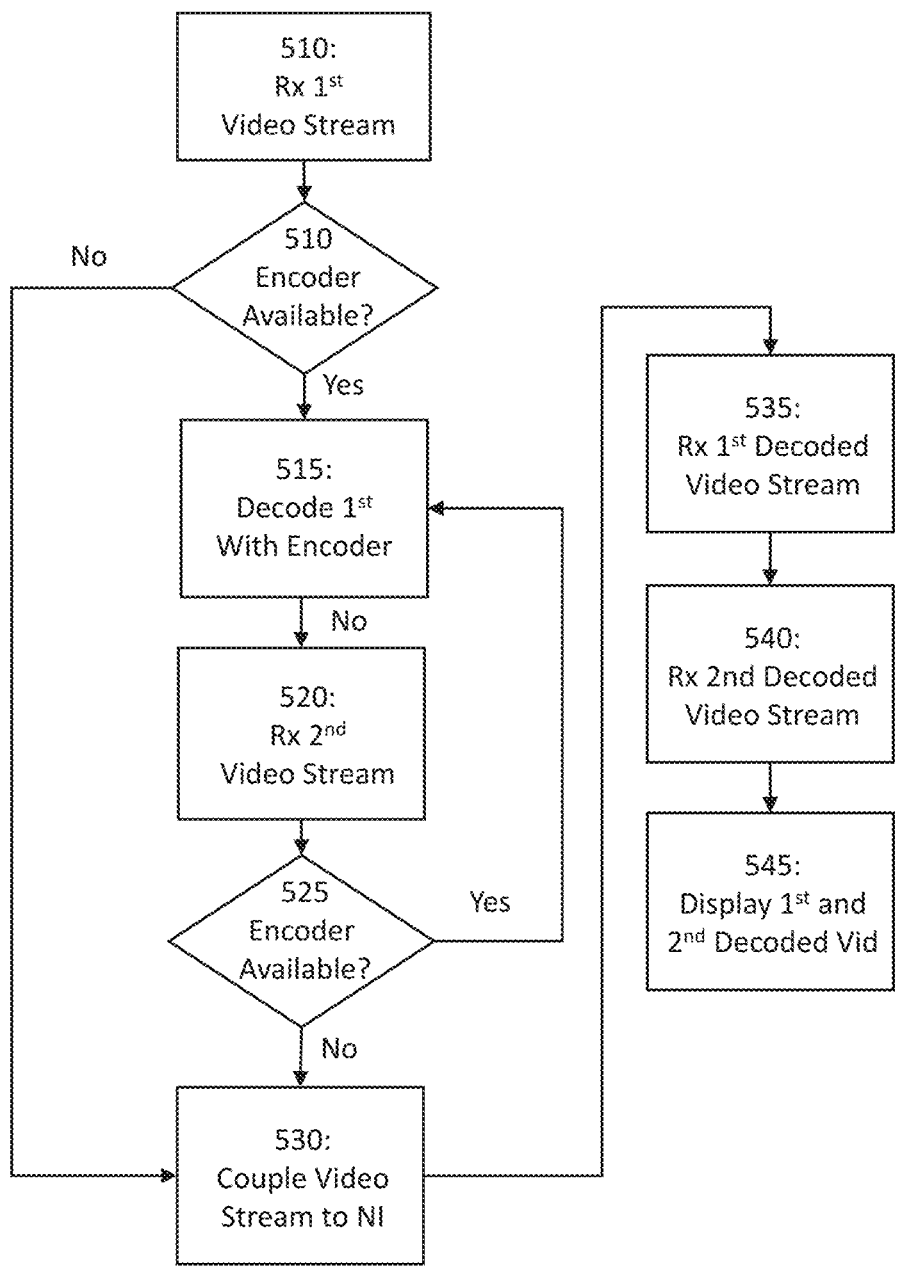
FIG. 5 shows another method 500 for preview decoding for joint video production according to another exemplary embodiment of the present disclosure.

Turning now to FIG. 5, another method 500 for joint video production in an electronic device according to an exemplary embodiment of the present disclosure is shown. The method 500 is first operative for receiving 505 a first video stream from a first video capture device. In an exemplary embodiment, the first capture device may be a video camera and the first video stream may be received via a wireless local area network.

The method is next operative for determining 510 an availability of a first decoder. The availability of the first decoder may be determined in response to the first decoder performing a video decoding function. The method may next be configured for coupling 515 the first video stream to the first decoder in response to the first decoder being available. If the first decoder is determined to be occupied and unavailable to decode the first video stream, the method may next couple 530 the first video stream to a network interface for transmission to a secondary video decoder. In an exemplary embodiment, the secondary video decoder may be external to a device performing the method such as a secondary video processing hub connected to the device via an ethernet cable or the like and configured in tandem with the device.

The method is next operative for receiving 520 a second video stream from a second video capture device. The method is then configured for determining 525 the availability of the first decoder. If the first decoder is available, the method is operative to decode the second video stream with the first decoder. If the first decoder is not available, the method may next couple 530 the first video stream to a network interface for transmission to a secondary video decoder. In an exemplary embodiment, the method is operative for coupling 530 the second video stream to a network interface for decoding by an external decoder in response to the first decoder decoding the first video stream.

The method may be further operative for receiving 535 a first decoded video stream from the first decoder, receiving 540 a second decoded video stream from the network interface the network interface is configured to communicate with an external video processing device having the external decoder, and displaying 545 the first decoded video stream and the second decoded video stream on a user interface. wherein the first decoded video stream and the second decoded video stream are transmitted via a wireless transmission channel to the user interface.

In addition, the method may be further operative for transmitting one of the first decoded video stream and the second decoded video stream via the network interface in response to a user selection received via the user interface.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the disclosure in any way. To the contrary, various changes may be made in the function and arrangement of the various features described herein without departing from the scope of the claims and their legal equivalents.

The invention claimed is:

1. A method comprising:
receiving, by a primary video hub, a first encoded video stream directly from a first video capture device;
determining an availability of a first decoder within the primary video hub in response to receiving the first encoded video stream;
coupling the first encoded video stream to the first decoder in response to the first decoder being available to produce a first decoded video stream based upon the first encoded video stream;
receiving, by the primary video hub, a second encoded video stream directly from a second video capture device;
determining the availability of the first decoder in response to receiving the second encoded video stream;
in response to the first decoder being unavailable, transmitting the second encoded video stream from a network interface of the primary video hub to a secondary video hub for decoding by an external decoder within the secondary video hub,
wherein the secondary video hub is configured to stop decoding a third encoded video stream on the external decoder to begin decoding the second encoded video stream in response to receiving the second encoded video stream;
receiving a second decoded video stream from the secondary video hub via the network interface, wherein the second decoded video stream is decoded from the second encoded video stream transmitted by the primary video hub; and
simultaneously displaying the first decoded video stream decoded by the primary video hub and the second decoded video stream decoded by the secondary video hub on a user interface.

2. The method of claim 1 wherein the first decoded video stream and the second decoded video stream are transmitted via a wireless transmission channel to the user interface.

3. The method of claim 1 wherein the user interface is a tablet computer.

4. The method of claim 1 wherein the network interface is configured to communicate with the secondary video hub having the external decoder.

5. The method of claim 1 further including coupling a third encoded video stream to the first decoder in response to the first decoder having ceased decoding of the first encoded video stream.

6. The method of claim 1 wherein the first video capture device is a video camera and the first encoded video stream is received via a wireless local area network.

7. The method of claim 1 wherein the availability of the first decoder is determined in response to the first decoder performing a video decoding function.

8. The method of claim 1 further including transmitting one of the first decoded video stream and the second decoded video stream via the network interface in response to a user selection received via the user interface.

9. A primary video hub comprising:
an input configured to receive a first encoded video stream directly from a first camera and a second encoded video stream directly from a second camera;
a first decoder within the primary video hub configured to decode the first encoded video stream and generate a first decoded video stream;
a network interface configured to communicate with a second video hub via a network, wherein the second video hub is configured to stop decoding a previously selected capture stream to decode the second encoded video stream; and
a processor configured to transmit the second encoded video stream from the primary video hub to the second video hub via the network interface and to responsively receive a second decoded video stream based on the second encoded video stream from the second video hub, and configured to generate a user interface that simultaneously presents the first decoded video stream and the second decoded video stream for presentation on a display.

10. The primary video hub of claim 9 wherein the input is a wireless network interface and the first encoded video stream is transmitted via a wireless communications network from a first video capture device and the second encoded video stream is transmitted via the wireless communications network from a second video capture device.

11. The primary video hub of claim 9 wherein the first encoded video stream is captured by a smartphone and is streamed wireless to the input.

12. The primary video hub of claim 9 wherein the second encoded video stream is captured by a video camera and is streamed wireless to the input.

13. The primary video hub of claim 9 wherein the display is a user interface device and wherein the first decoded video stream and the second decoded video stream are transmitted wirelessly to the user interface device.

14. The primary video hub of claim 9 further including a transmitter for transmitting the first decoded video stream in response to a user input received via the display.

15. The primary video hub of claim 9 further including an encoder for encoding the first decoded video stream to generate an encoded video stream and a transmitter for transmitting the encoded video stream.

16. The primary video hub of claim 9 wherein the first decoder is operative to decode the second encoded video stream in response to the first decoder not decoding the first encoded video stream.

17. The primary video hub of claim 9 wherein the second decoded video stream has a lower resolution than the first decoded video stream.

18. The primary video hub of claim 9 wherein the processor is further configured to couple the second encoded video stream from the input to the first decoder and to couple the first encoded video stream to the network interface in response to a user generated control signal.

19. A video streaming system comprising:
a wireless access point that receives a first encoded video stream from a first camera and a second encoded video stream from a second camera;
a decoder within a primary video hub that decodes the first encoded video stream to generate a first decoded video stream;
a network interface of the primary video hub in electronic communication with a secondary video hub having a secondary video decoder via a network;
a processor that forwards the second encoded video stream from the primary video hub to the secondary video hub when the decoder is decoding the first encoded video stream, wherein the secondary video decoder of the secondary video hub stops decoding a third encoded video stream to decode the second encoded video stream to produce a second decoded video stream that is received by the primary video hub via the network interface; and
a display device that displays a user interface that simultaneously presents the first decoded video stream from the decoder within the video streaming device and the second decoded video stream from the secondary video decoder of the secondary video hub.

20. The video streaming system of claim 19 wherein the processor is further configured to couple a third encoded video stream to the secondary video hub via the network interface in response to a user generated control signal.

* * * * *